United States Patent
Deo et al.

(10) Patent No.: US 9,269,094 B2
(45) Date of Patent: Feb. 23, 2016

(54) SYSTEM AND METHOD FOR CREATING AND IMPLEMENTING SCALABLE AND EFFECTIVE SURVEYS AND TESTING METHODS WITH HUMAN INTERACTION PROOF (HIP) CAPABILITIES

(71) Applicant: EngageClick, Inc., Fremont, CA (US)

(72) Inventors: Shekhar Kumar Deo, Fremont, CA (US); Manoj Rajshekar, Fremont, CA (US); Thyagarajapuram S. Ramakrishnan, Saratoga, CA (US)

(73) Assignee: ENGAGECLICK, INC., Fremont, CA (US)

( * ) Notice: Subject to any disclaimer, the term of this patent is extended or adjusted under 35 U.S.C. 154(b) by 308 days.

(21) Appl. No.: 13/961,557

(22) Filed: Aug. 7, 2013

(65) Prior Publication Data

US 2014/0067474 A1 Mar. 6, 2014

Related U.S. Application Data

(60) Provisional application No. 61/696,709, filed on Sep. 4, 2012.

(51) Int. Cl.
| | |
|---|---|
| *G06F 7/04* | (2006.01) |
| *H04L 9/32* | (2006.01) |
| *G06F 21/00* | (2013.01) |
| *G06Q 30/02* | (2012.01) |
| *H04L 29/06* | (2006.01) |
| *G06F 21/31* | (2013.01) |

(52) U.S. Cl.
CPC ............ *G06Q 30/0203* (2013.01); *G06F 21/31* (2013.01); *G06F 2221/2133* (2013.01); *H04L 63/08* (2013.01); *H04L 63/083* (2013.01)

(58) Field of Classification Search
CPC ....... H04L 63/08; H04L 63/083; G06F 21/31; G06F 2221/2133
USPC .......................... 726/26, 5; 713/168, 170, 182
See application file for complete search history.

(56) References Cited

U.S. PATENT DOCUMENTS 7,904,517 B2 * 3/2011 Kang et al. .................... 709/206

\* cited by examiner

*Primary Examiner* — Aravind Moorthy
(74) *Attorney, Agent, or Firm* — Michael A. Glenn; Perkins Coie LLP

(57) ABSTRACT

A system and method provide digital online surveys and testing using interactive multi-media content with an option to enable and disable Human Interaction Proof (HIP) capabilities. The system uses random interactivity with multi-media content as HIP validation and subsequently make the user take a test or online survey. The system associates successful completion of tests to rewards. The rewards are awarded by publishers or stakeholders wanting to conduct the survey or test or by third party affiliates that are part of the exchange connecting the content provider and the advertiser wishing to conduct the test, with the option to enable and disable HIP capabilities. The system segments such tests and surveys across demographics. The system captures analytics as part of HIP along with testing and survey results. Such combined analytics have demographics as different dimensions. The system uses haptic technology for HIP and to complete the test or survey.

20 Claims, 15 Drawing Sheets

SYSTEM AND METHOD FOR CREATING AND IMPLEMENTING SCALABLE AND EFFECTIVE SURVEYS AND TESTING METHODS WITH HUMAN INTERACTION PROOF (HIP) CAPABILITIES

CROSS REFERENCE TO RELATED APPLICATIONS

This patent application claims priority from U.S. Provisional Patent Application Ser. No. 61/696,709, "System and method for creating and implementing scalable and effective surveys and testing methods with HIP capabilities", filed Sep. 4, 2012, the entirety of which is incorporated herein by this reference thereto.

BACKGROUND OF THE INVENTION

1. Technical Field

This invention relates generally to the field of digital surveys and testing methods. More specifically, this invention relates to creating and implementing scalable and effective surveys and testing methods, each with human interaction proof (HIP) capabilities.

2. Description of the Related Art

CAPTCHAs

The growth of Internet usage across different interfaces and devices has led to widespread adoption across many demographics. The number of websites is ever increasing and more financial transactions take place on the Internet. Websites are widely used to provide users with a convenient way to order products, e.g. tickets, to access personal account information, to open new email accounts, to add content to existing content such as comments on blogs, to upload multimedia content on websites, or to access other services. These systems are not only convenient to website owners as well as to their users, but they also reduce overall costs.

Unfortunately, such websites and associated systems may also provide a loophole through which hackers may obtain access to such websites or associated systems. For example, such hackers may access personal or other restricted data, disrupt services, poison existing content with irrelevant information declining the value of existing content, consume all the resources of the website for malicious activities, and distribute worms or spam. Such undesirable activity is commonly accomplished through the use of automated bots, scripts, and other malicious computer programs.

The presence and activities of such undesirable computer programs have led to the development of Human Interaction Proof (HIP) technology. HIP capabilities include challenges designed to be solved by humans. For example, typically HIP challenges may be easier for humans to solve, but difficult enough to make the cost of developing or processing a malicious bot or script to break it, uneconomical and challenging.

One widely used form of HIP technology is a Completely Automated Public Turing test to tell Computers and Humans Apart (CAPTCHA). For purposes of understanding herein, CAPTCHA technology is a challenge-response process or system that attempts to ensure the response is from a human being. CAPTCHA usage has been found to help isolate human traffic from malicious bot or script traffic.

As well, it has been found that CAPTCHAs are fast becoming pervasive and useful across the Internet as sites move towards supporting collaborative, user-generated content, making the need for distinguishing genuine, human users from bots and scripts, as well as maintaining user privacy more critical.

Online, Digital Tests and Surveys

Online surveys have been a great resource for understanding consumer behavior, product pricing, product placement, market acceptance, etc. Some of such surveys are sent to private groups through e-mail or other type of digital messaging services. As well, some such surveys are being provisioned in large scale. For example, high traffic websites may host surveys to attract large amounts of attention.

Some current problems with such online surveys are that the surveys may be too long and may inadvertently attract less user attention than intended. As well, typically, users are not very engaged with survey challenges. Further, with current digital survey techniques, survey owners or presenters do not have options available for obtaining attention from users from different demographic and geographical sources. Further, trusting survey results may be quite challenging due to the presence and activities of the numerous Internet bots that attack such surveys, thereby disturbing or contaminating survey results.

Presently, online, digital testing may be deployed using similar approaches as described above. For example, one of the interesting types of testing is referred to as AB testing. For purposes of understanding herein, AB testing a type of testing that is used for comparing two items with the objective of help in decision-making. AB testing has been found to be very important in many areas such as branding, banner ads, marketing messages, promotion messages, launching new products, etc. AB testing also may be about randomly showing users participating in any user workflow on a particular website versions of a digital media content being tested, such as for example company logos, ads, models in ads, e.g. which model looks good in a particular costume to be on the cover of a major magazine, webpages, marketing analytics, ringtones, landing pages of websites, etc.

SUMMARY OF THE INVENTION

A system and method provide digital online surveys and testing methodologies, such as but not limited to AB testing, using interactive multi-media content with an option to enable and disable Human Interaction Proof (HIP) capabilities. The system may use random interactivity with multi-media content as HIP validation and subsequently make the user take a test, e.g. AB test, or an online survey. The system may associate successful completion of tests to rewards on the websites. The rewards may be awarded by a publisher or stakeholder, e.g. advertiser, company launching a product, tagline, content, etc., wanting to conduct the survey or test or by a third party affiliate that is a part of the exchange connecting the content provider and the advertiser wishing to conduct the test, with an option to enable and disable HIP capabilities. The system may segment tests and surveys, with an option to enable and disable HIP capabilities, across variations of demographics. The system may collect data and thereby capture analytics as part of HIP along with the testing and survey results. Such combined analytics may have demographics as different dimensions. The system may use haptic technology to satisfy HIP and may also use haptic technology to complete the test or survey.

DETAILED DESCRIPTION OF THE INVENTION

Figure 1:
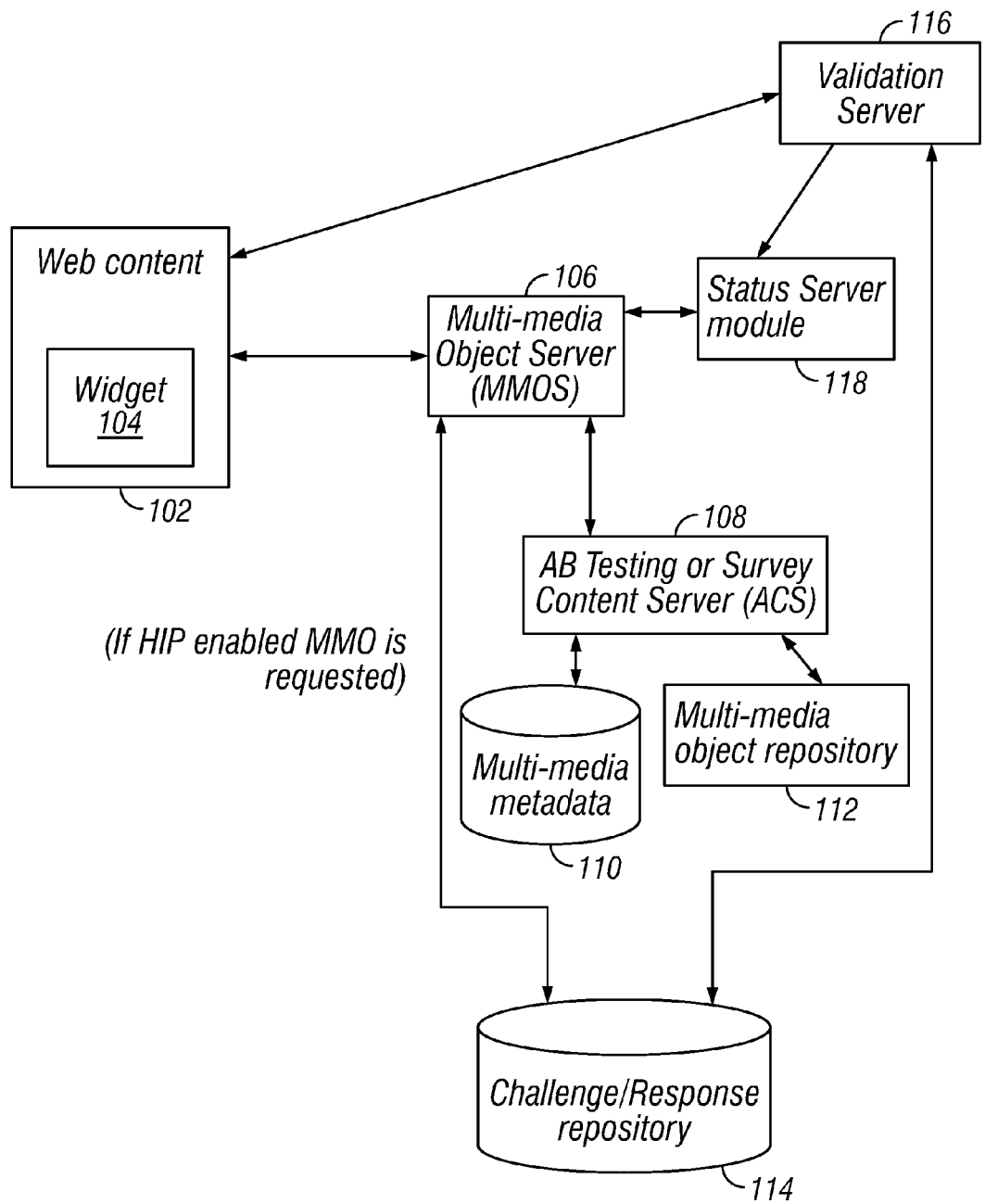
FIG. 1 is a block schematic diagram of main components and their interrelations according to an embodiment.

A system and method ("system") provide digital online surveys and testing methodologies, such as for example AB testing, using interactive multi-media content with an option to enable and disable Human Interaction Proof (HIP) capabilities. The system may use random interactivity with multi-media content as HIP validation and subsequently request that the user take a test, e.g. AB test, or an online survey. The system may associate successful completion of tests to rewards on the websites. The rewards may be awarded by a publisher or stakeholder, e.g. advertiser, company launching a product, tagline, content, etc., wanting to conduct the survey or test or by a third party affiliate that is a part of the exchange connecting the content provider and the advertiser wishing to conduct the test, with an option to enable and disable HIP capabilities. The system may segment tests and surveys, with an option to enable and disable HIP capabilities, across variations of demographics. The system may collect data and thereby capture analytics as part of HIP along with the testing and survey results. Such combined analytics may have demographics as different dimensions. The system may use haptic technology to satisfy HIP and may also use haptic technology to complete the test or survey.

It should be appreciated that for purposes of understanding, discussions herein may refer to only a test or only a survey. However, one skilled in the art would readily recognize that the invention is not limited to such and that other mechanisms for obtaining informational data about products, service, and the like, can be used or referred to in the discussions, as well.

The invention provides an innovative solution aimed at, but is not limited to being aimed at, crowd-sourcing surveys and testing methods with HIP capabilities on websites, on user workflows on websites, and on applications or games.

An embodiment provides capability to provide a survey attached with HIP capabilities. Providing a survey or the like may imply that the trust level of the survey result may be very high as opposed to results from a survey with HIP capabilities disabled, as those results may not be from even a human. That is, the system ensures that each person who participates in the survey is human and not the Internet bots or other non-human mechanisms.

An embodiment allows completing the AB testing or splitting testing with HIP capabilities. It should be appreciated that AB testing is a methodology in advertising of using randomized experiments with two variants, A and B, which are the control and treatment in the controlled experiment. Such experiments are commonly used in web development and marketing, as well as in more traditional forms of advertising. Other names include randomized controlled experiments, online controlled experiments, and split testing. As with surveys, the HIP capability in testing ensures that only a human performs the testing. An embodiment allows multiple themes and some custom themes to incorporate AB testing elements with the HIP elements, as discussed in further detail herein below.

There are various benefits using the HIP enabled surveys or testing, such as but not limited to:

Only a human performs the surveys or testing and not non-human Internet agents such as Internet bots, spiders, etc.

Because HIP enabled surveys or testing may appear in a user flow that can be skipped, the user engagement is guaranteed.

In present day surveys or testing, the user may not see any value in the survey or test, but surveys or testing in accordance with embodiments herein provide some value to the user such as for example, security, privacy, etc.

These surveys or testing may help the user to perform the HIP requirement quicker and easier.

Implementing such surveys or tests with HIP capabilities may be done easily on mobile and tablet devices as well.

An Exemplary Embodiment

An exemplary embodiment may be understood with reference to FIG. 1, a block schematic diagram of the main components and their interrelations. For purposes of understanding herein, a particular flow of events is discussed in terms of seven steps. However, one skilled in the art would readily recognize that such seven steps are for illustrative purposes only and are not meant to be limiting. For example, there may be other steps, intermediate or otherwise, which are not enumerated. And, conversely, various embodiments may be contemplated that may not include all seven steps, as well.

Step 1.

In an embodiment, a user visits a website which has a web based workflow with several steps to accomplish a task. Examples of such tasks may include but are not limited to registration, purchasing a product, adding user created content to existing content, accessing content in a smartphone app, playing games, etc. In the embodiment, a webpage 102 which involves the workflow may be served to the user by a publisher website (not shown.) In the embodiment, webpage 102 calls a Multi-media object server (MMOS) 106 to fetch a multi-media object (MMO.) Examples of such objects may include but are not limited to an image, video, or audio. In addition to fetching the multi-media object, additional attributes are sent to MMOS 106 including but not limited to website details, user demographic details, behavioral pattern of user, if any, and so on. An additional important attribute indicating whether user or human interaction proof from the MMO is required or not is also sent to MMOS 106 from webpage 102.

In an embodiment MMOS 106 contains a component (not shown) that is configured to extract objects of interest from the image and find more metadata about the extracted objects such as but not limited to classes to which the objects belong, e.g. travel, food, entertainment, etc., the shape of the objects, the color of the objects, and so on. These metadata are extracted and stored in multi-media metadata servers 110 as part of the MMO repository and metadata database.

Details.

Some particular details are described herein below. It should be appreciated that the particular details are by way of example only and are not meant to be unnecessarily limiting. In accordance with one or more embodiments, a user uses a web browser or an html webview on his smartphone application. He launches webpage 102, which has a widget 104 that is configured to request a multi-media object, e.g. an image, video, or audio. Widget 104 calls MMOS 106 and passes information about the system environment such as but not limited to ip address, geo location, device type, carrier name, user demographic, or html cookie information related to the website or application which makes the request and an additional attribute which contains information about whether HIP is requested or not. In an embodiment widget 104 is code that is embedded into webpage 102. The code is in the form of a web standard tag which will send web requests and also collect user interaction responses, which are described in detail herein below. In an embodiment, the HIP requested or not attribute may be a yes or no value. Further, such attribute may be the determining factor about whether the system needs to make sure the interaction is by a human interacting with the ad or content or a bot interacting with the ad or content. Another key attribute which also may be sent is an attribute which indicates a type of interaction expected for HIP proof. Examples of types of interaction may include but are not limited to: dragging a masked image to other co-ordinates and then allowing the user to interact with the image shown behind; clicking on various objects; moving or dragging various objects to a specified destination on the display; placing a mouse over an area of the display and going through the motion of wiping off something on the display; drawing something particular on the display; moving or dragging targets from one area of the display to another; or press buttons on the display.

Step 2.

In an embodiment, MMOS 106 in turn calls an AB Testing or Survey Content Server (ACS) 112 to identify the tests or surveys that could be served for this particular request. Filter criteria are based on the attributes, also referred to herein as parameters, sent by webpage 102 in the earlier step. That is, ACS 108 parses a request based on the parameters and serves the corresponding matched MMOs to MMOS 106. It should be appreciated that in an embodiment, MMOS parses the requests to identify but not limited to website details, user demographic details, behavioral pattern of user, if any, and so on. An additional important attribute indicates whether user or human interaction proof from the MMO is required or not. MMOS constructs a request based on the attributes it has parsed and sends it to ACS. ACS parses the request from MMOS on what survey or AB tests need to be served.

Details.

Some particular details are described herein below. It should be appreciated that the particular details are by way of example only and are not meant to be unnecessarily limiting.

In an embodiment, the parameters sent by the user's browser in the previous step are extracted and parsed by MMOS 106. MMOS 106 passes the parameters to ACS 108 along with a unique request ID.

In an embodiment, surveys or AB testing related data have been previously stored in a multi-media metadata database 110. Such surveys or AB testing related data may include but are not limited to survey questions, valid survey answers, links to survey images in a multi-media repository 112, or demographic data which may need to be targeted to surveys, such as for example to show these surveys to women in Washington D.C., men in Palo Alto, and users visiting financial news sites. Multi-media object repository 112 may contain but is not limited to containing images, videos, or audio files, any of which may be used as part of the survey or as part of AB testing. The data sent by MMOS 106 may be used to match with the surveys or AB tests target data in multi-media metadata 110. It should be appreciated that ACS 108 parses the request from MMOS 106 and performs the matching. Once the match is found the survey identifier, which is an identifier of the particular matched survey or testing related data, survey questions, and associated multi-media objects are sent back from MMOS 106 to ACS 108 along with the unique request id and ACS 108 serves the matched MMOs and the unique request id to MMOS 106. It should be appreciated that in an embodiment, such association is determined by the survey questions and answers forming the predefined data which are associated at the time of creation of surveys.

Step 3.

In an embodiment, MMOS 106 also parses the details sent by the publisher's webpage 102 for an attribute or parameter which defines an interactivity requirement for human interaction proof (HIP). For example, such attribute may be set to a, ON or OFF value. When such attribute is set to ON, the desired MMO, which is part of the test or survey sent by ACS 108, is sent with a challenge.

Details.

Some particular details are described herein below. It should be appreciated that the particular details are by way of example only and are not meant to be unnecessarily limiting. In an embodiment, as part of the initial payload sent by webpage 102 in Step 1, MMOS 106 parses through the parameters sent to identify if the HIP needed attribute is turned ON or OFF. If such attribute is set to ON, then MMOS 106 searches a challenge and response repository 114 for a challenge and response associated with particular survey or multi-media content. In an embodiment, the association between challenge and response is predetermined and stored as part of the metadata in challenge response repository 114. In an embodiment, challenge and response repository 114 has been previously stored with HIP enabling questions and valid answers. In an embodiment, the questions and valid answers are previously defined and stored in 114 and for dynamic creation of challenge response the rules to create dynamic questions and responses are predetermined and stored in 114. For dynamic creation an example is to add geometrical images around a multi-media object with colors from a pre-determined set. The question could randomly pick from the geometrical image with the color and pose that as the expected response. MMOS 106 in dynamic creation reads the rules of dynamic question and response creation from the repository and in the pre-created question and response reads the question and response from 114. In an embodiment, such HIP enabling questions and valid answers may be associated with the multi-media content used in surveys, such as but by no means limited to click on the burger in the burger image of an ad, which would also be associated with a survey for a burger company. In an embodiment, the challenge may be randomly chosen from possibilities available.

Step 4.

In an embodiment, when HIP is requested, the HIP challenge and question combination for the MMO is fetched from challenge and response repository 114. It should be appreciated that the type of challenge and question combination may be a specific challenge and question or a random challenge and question combination for the MMO. Further, it should be appreciated that the MMO may be random and the system selects a particular challenge and question combination type for the random MMO. Once the MMO and challenge and question combination are selected, the matched MMO with the challenge and response, referred now as HIP enabled, is sent back to MMOS 106 for serving.

Details.

Some particular details are described herein below. It should be appreciated that the particular details are by way of example only and are not meant to be unnecessarily limiting. In an embodiment, the challenge may be dynamically generated by MMOS 106 with predetermined data from challenge response repository 114 and may or may not have any correlation to the contents in the ad and served as an HIP question. An example may be around an image showing a restaurant chain ad associated with a survey. Such challenge may have small random colored geometrical objects on or around the survey ad and asks the user to tap/click on the green circle and then the yellow square before answering the survey. The next time the same survey ad is shown, the geometrical objects and colors may change randomly and the challenge may ask the user to click/tap on the brown triangle and then the orange rectangle before taking the survey. In this example, such challenge and question combination ensures that the HIP is completed before taking the survey. Examples of such challenge and question combination not having correlation to the contents in the ad are shown in FIGS. 2, 3, 4, and 5, each of which is described in detail hereinbelow.

Similarly, the objects of the challenge may pertain to the content of the survey ad. For example, such objects may include different colored spoons, forks, or bowls which pertain to the content of a restaurant ad and that may be used as a HIP check. In an embodiment, whether the challenge or question pertains to the content of the survey ad may be determined based on a parameter sent as part of Step 1, along with the HIP needed attribute.

Regardless of the type of challenge, once the challenge is identified, e.g. by challenge and response repository 114, it is sent, in addition to the survey sent by ACS 108, to MMOS 106.

Step 5.

In an embodiment, MMOS 106 serves the MMO with the challenge and question combination to webpage 102. When the MMO with HIP is requested, webpage 102 displays the MMO with the challenge and question combination and also has a placeholder attribute for capturing the user response to the challenge and question combination. Examples of such user responses may include but are not limited to text entered as a response, attributes of a click, co-ordinates of a drag and drop action on the MMO, responses from haptic technology on supporting devices, or responses from touch and tactile sensors on supporting devices.

It should be appreciated that showing test or survey objects may be preceded by satisfying the HIP component or may be followed by the HIP component, i.e. after the test or survey is completed.

An example to satisfy the HIP part may include the user being asked to interact by dragging the image to a different set of coordinates and then answer the remaining challenge, which may be part of the test. A sample use case is drag the masked image to randomly generated co-ordinates, e.g. to the right, and then interact with the image shown behind, e.g. the AB test, in this case. For example, for the AB test the task might be choose between the 2 images shown to determine which one the user likes. Along with the AB test data if HIP is turned on, to prove that the user is not a bot, there might be a question and response associated such as drag the masked image to the right and then take the AB test of clicking the preferred image. This is to ensure that the bot or an automated process is not clicking randomly on the AB test or survey. An example use case of dragging the masked image to other co-ordinates and then allowing the user to interact with the image shown behind can be found in FIG. 5.

Details.

Some particular details are described herein below. It should be appreciated that the particular details are by way of example only and are not meant to be unnecessarily limiting. In an embodiment, MMOS 106 sends to webpage 102 the MMO with the option to enable and disable the HIP challenge based on whether the HIP needed attribute was ON or OFF as indicated in the request sent by widget 104, for example as in Step 1. In an embodiment, the MMO and the challenge are served on the webpage 102 with instructions to the user on how to respond. In an embodiment, the instructions are part of the MMO because the MMO is a file and the instructions are additional html metadata to be displayed on the webpage. By way of example only and not to be limiting, when the HIP challenge is part of the response, the instructions may be "Please solve the challenge by clicking/tapping on the brown triangle and then the orange rectangle before taking the survey to prove that you are a human". As another example, the instructions may be "Type in the number of green circles shown around the MMO and then take the survey".

In an embodiment, widget 104 provisions the user with the instructions to input any data and collects such input data, i.e. on the browser side, before sending such data along with the unique request id to a validation server (VS) 116. In an embodiment, the unique request id is created by MMOS when the first request comes from the widget. When the widget is shown on a page it communicates with MMOS requesting a AB test/Survey with additional metadata to help MMOS to determine what kind of AB test needs to be sent.

Step 6.

In an embodiment, once the user interacts with the MMO, interaction attributes are sent to validation server 116 as response attributes. Examples of such response attributes may include but are not limited to text entered as a response, attributes of a click, co-ordinates of the drag and drop action on the MMO, haptic technology on supporting devices, or responses from touch and tactile sensors on supported devices such as but not limited to touch-screen monitors, computers, smart-phones, or game consoles.

Details.

Some particular details are described hereinbelow. It should be appreciated that the particular details are by way of example only and are not meant to be unnecessarily limiting. In an embodiment, once the user response is collected on the browser side, the response data is sent to validation server 116 along with the request id. Examples of such response data may include but are not limited to how much time the user hovered on the MMO, how many times the user tapped to solve the HIP, how many times the MMO was displayed on the active screen of the user. It should be appreciated that the request id uniquely ties the process from the initial request in Step 1 to a validation and final submission of the particular associated survey or AB test from ACS 108 to MMOS 106.
Step 7.

In an embodiment, validation server 116 validates the response attributes to the challenge served for the MMO and verifies with a dataset at challenge and response repository 114 for a possible match. It should be appreciated for purposes of understanding herein, validating the response attributes includes making sure that the data in the response attributes are valid data, whereas verification includes determining whether the data are the correct data, i.e. matches substantially closely with acceptable data. When the attributes of the response satisfy the challenge, a success message is sent to webpage 102 by validation server 116.

In an embodiment, upon webpage 102 receiving the success message, webpage 102 displays the rest of the MMO which shows the test or survey. After the user interacts with the test or survey images, the results are sent to a status server module (SUS) 118. In an embodiment, SUS 118 collects responses sent by the user. The responses provide the analytics to be reported for the AB tests or surveys. As well, SUS 118 holds data for HIP results such as for a request where HIP was needed, was the user response valid or not. Such data may be used to provide analytics. The process is flexible and one variation of such process may include showing the HIP component, then showing the test or survey, and then sending both statistics for validation and statistics for data collection to VS 116 and to SUS 118 for data collection in SUS 118 and VS 116 for validation check if HIP was requested. Another variation may include sending the validation for HIP from webpage 102 to VS 116 and then showing the test. Another variation may include showing the test or survey and then showing the HIP challenge.

In an embodiment, on success, webpage 102 may move to a different webpage, which may be a next step in the workflow. Examples of such next steps in the workflow may include but are not limited to a confirmation page in registration, a confirmation page on successful purchase, or a confirmation page which displays successful addition of content to existing content.

In an embodiment, failure may be defined based on a predefined threshold such as a predetermined number of attempts allowed before locking out the user from the process. As well, an embodiment includes showing a new challenge with a new set of tests or surveys when the user has not been successful in accordance with a threshold, such as but not limited to a predetermined amount of time lapsed or a predetermined number of attempts.
Details.

Some particular details are described hereinbelow. It should be appreciated that the particular details are by way of example only and are not meant to be unnecessarily limiting. In an embodiment, validation server 116 checks the request id and obtains particular detailed data using the request id (when a request id is created by MMOS 106, it gets stored in SUS 118) from challenge and response repository 114 of what challenge was served, what MMO was served, what survey or AB tests were served, and the valid answer. VS 116 validates the response, i.e. the response attributes, to the right answer for the challenge by comparing to the response attributes. In an embodiment, VS 116 validates the user response for a question sent with the valid question and response stored in challenge response repository 114. The validated response attributes are recorded in status server module 118.

It should be appreciated that when the HIP needed attribute is ON for the request id, the response is validated with the expected answer for the challenge. If the response matches the expected answer, the browser, e.g. webpage 102, is notified. For example, in the embodiment, VS 116 sends a parameter such as a "validated=" parameter set to "TRUE" back to webpage 102. The result that the response is validated, along with the survey or AB tests results, are recorded as HIP validated results in status server module 118. As well, when the HIP needed attribute is ON and the validation is false, then the parameter, validated=FALSE parameter is sent back to webpage 102.

It should be appreciated that what happens in the flow after validation is determined may be a design issue. For example, when the owner of webpage 102 which contains widget 104 may have the flexibility to allow the user to continue to the next step or try a few more times before invalidating the traffic.

In an embodiment, on the server side, such validation or non-validation results along with the survey or AB test results may be recorded as HIP validated results in status server module 118. When the HIP needed attribute is turned OFF in Step 1, then the survey or AB tests are recorded in status server module 118 along with data reflecting that the HIP needed attribute is OFF.

An Exemplary Flow of Ads Through the System

Figure 15:
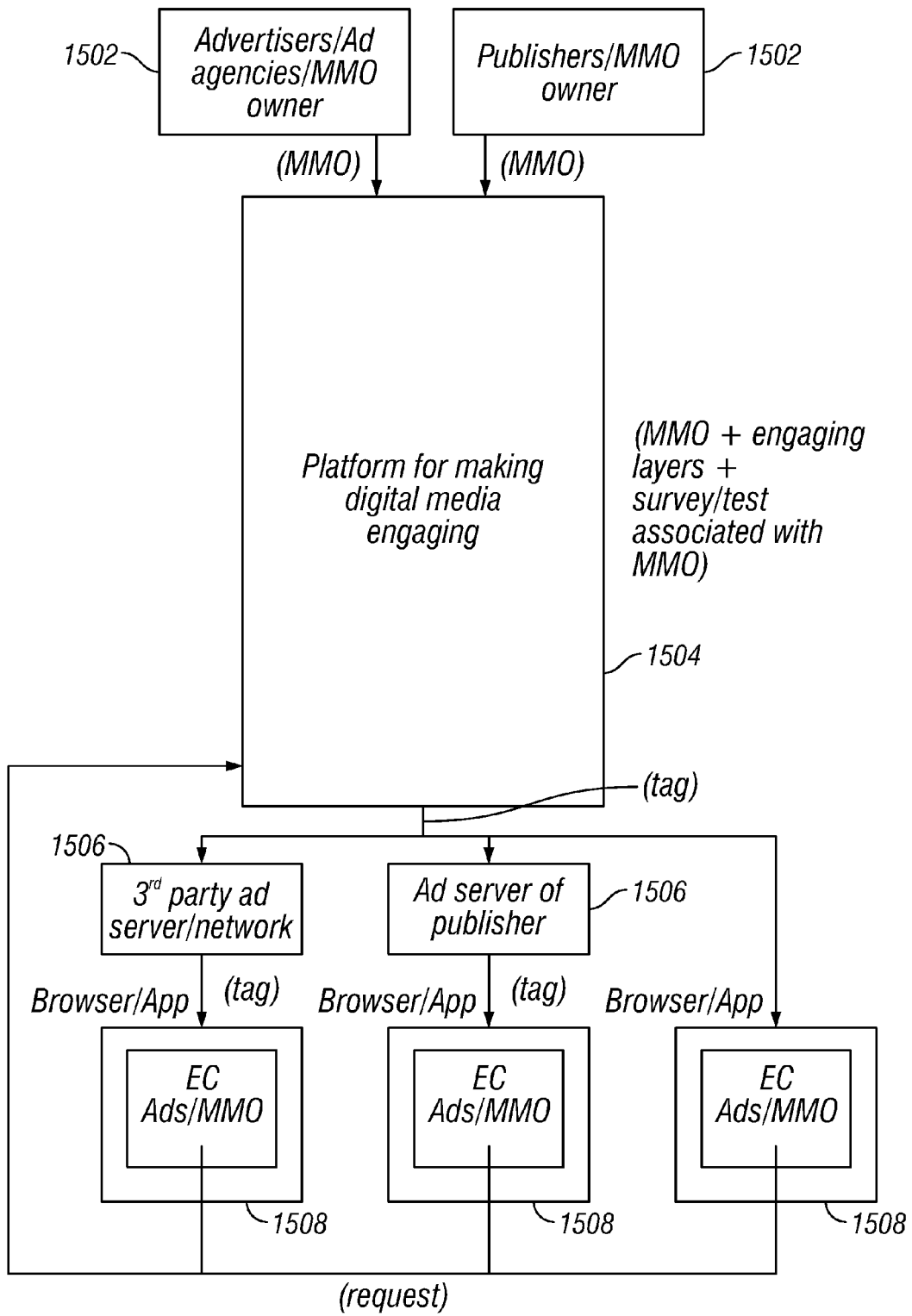
FIG. 15 is a high level architectural diagram of how digital media owners may use the system to make the digital media more engaging by having more engaging layers added to their digital media according to an embodiment.

An embodiment of an exemplary flow of ads can be understood with reference to FIG. 15, as well as FIG. 1. In an embodiment, digital media owners 1502 such as but not limited to advertisers, agencies, ad networks, and large publishers may use the system 1504 as a type of platform to make digital media more engaging. In an embodiment, system 1504 receives MMOs as input and adds more engaging layers to such MMOs. Examples of the engaging layers may include but are not limited to additional interactive elements such as a scratch card that can be scratched to see something hidden, a drawing pencil that can be used to draw something on the ad, a peeling layer that can be peeled off to see something hidden, and a survey or test associated with particular different MMOs where a user is asked to answer some questions. System 1504 analyzes the MMOs and understands different elements of MMO by using MMOS 106.

In an embodiment, MMO analysis involves feature extraction of the MMO including salient feature detection, object detection and recognition, text detection, text recognition, audio transcription, etc. It should be appreciated that the output of MMO analysis is an important metadata set that tells more about the MMO.

These metadata are stored in multi-media metadata server 110. System prioritize the metadata based on various parameters such as number of salient features detected, number of texts detected and recognized, number of objects detected and recognized, etc. The metadata that comes higher on this priority list act as the key elements for engagement layer. Using this metadata of the MMO, system 1504 finds the optimal engagement layers that suit the MMO. In an embodiment, to make a better selection of an engagement layer, audience information such as but not limited to IP address, device type, operating system of the device type, application, or website is used. Digital media owners 1502 may also provide targeted audience information to system 1504. In an embodiment, HIP may be turned on or off for such engagement layers, which may also be referred to herein as engagements.

In an embodiment, system 1504 creates a tag, e.g. lines of script code, that may be embedded into a MMOs server 1506 that is used to serve MMOs. MMO server basically executes the script code that fetches the MMO with engagement layer from local/remote server where MMO has been kept.

Examples of such servers may include but are not limited to third party ad servers, ad servers of the large publishers, or third party ad networks. In an embodiment, such tags are passed to the browsers or applications 1508 through servers 1506. When browsers run these tags, a request goes to system 1504 to get the MMOs with engagement layers on top it, for example as described in detail hereinabove. If the engagement layers (also called as engagements) and the MMOs, i.e. engagements are kept somewhere else, such as at another server, the request goes to that server to fetch the engagements. The script code knows where the MMO and engagements are kept and the ad server, for example, just need to execute the code that goes to the MMO server to get the engagement and MMOs. MMOs and engagements can be kept together or in different servers. If the HIP is turned on for these engagements, validation server 116 requires the user to act according to the engagement layers. After the user engagement is over on the engagement layers, browsers/applications 1508 informs validation server 116 that ultimately informs the client side, e.g. browser/application side, server with the HIP result. Such results are also sent to system 1504. Based on a configuration set for the combination of engagements, publishers, and applications, a consecutive MMO with engagement layer is sent again or the configuration allows the session to complete.

Exemplary Figures

Figure 2:
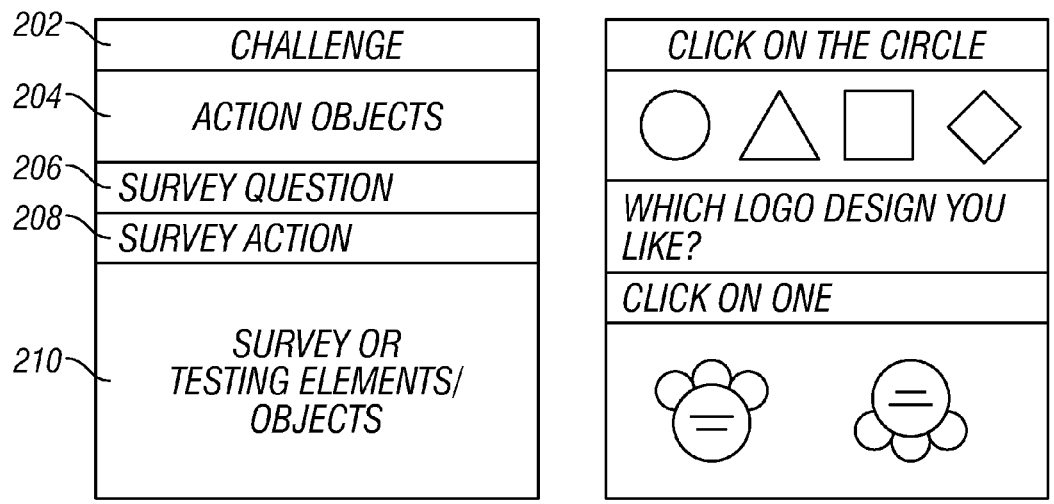
FIG. 2 is a sample user interface of a sample use case according to an embodiment.

FIG. 2 shows a schematic drawing of an example use case according to an embodiment. In this example use case, a challenge 202, action objects 204, a survey question 206, a survey action 208, and survey or testing element or objects 210 are provided by the system. In this particular example, challenge 202 is "CLICK ON THE CIRCLE"; action objects 204 are a circle, triangle, square, and a diamond; survey question 206 is, "Which logo design do you like?"; survey action 208 is "Click on one"; and survey or testing elements or objects 210 are doodle and the same doodle drawn upside down (to represent any objects.)

Figure 3:
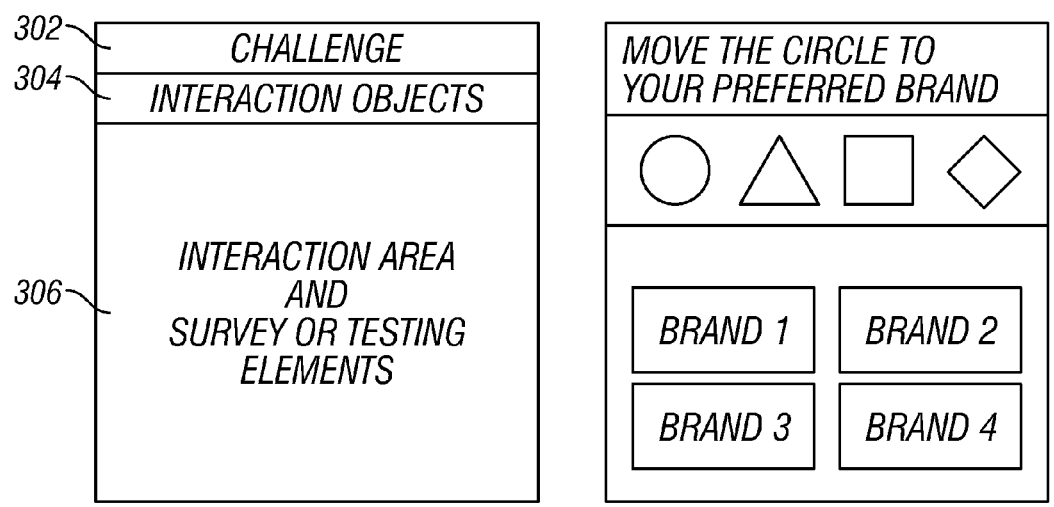
FIG. 3 is another sample user interface of a sample use case according to an embodiment.

FIG. 3 shows a schematic drawing of an example use case according to an embodiment. In this example use case, a challenge 302, interaction objects 304, and an interaction area with survey or testing elements 306 are provided by the system. In this particular example, challenge 302 is "MOVE THE CIRCLE TO YOUR PREFERRED BRAND"; interaction objects 304 comprise a circle, triangle, square, and a diamond; and interaction area with survey or testing elements 306 contain four icons labeled Brand 1, Brand 2, Brand 3, and Brand 4, respectively.

Figure 4:
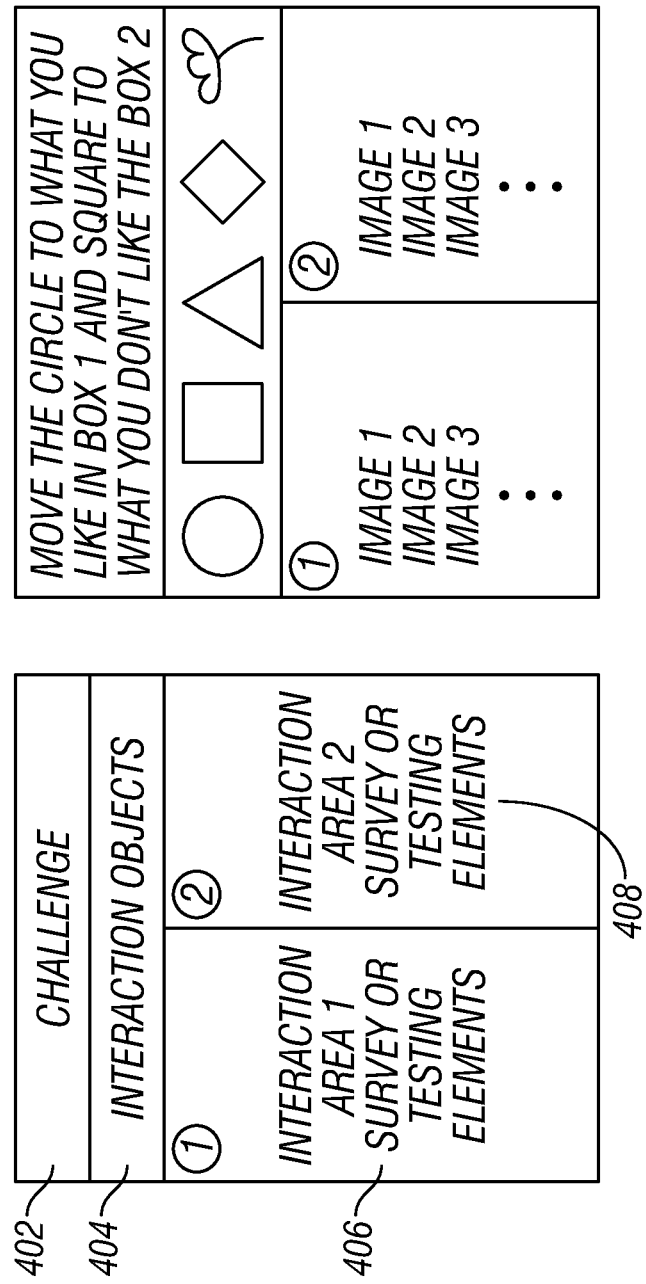
FIG. 4 is another sample user interface of a sample use case according to an embodiment.

FIG. 4 shows a schematic drawing of an example use case according to an embodiment. In this example use case, a challenge 402, interaction objects 404, and two interaction areas with survey or testing elements 406 and 408, respectively, are provided by the system. In this particular example, challenge 402 is "MOVE THE CIRCLE TO WHAT YOU LIKE IN BOX 1 AND SQUARE TO WHAT YOU DON'T LIKE IN BOX 2"; interaction objects 404 comprise a circle, square, triangle, a diamond, and a doodle; first interaction area with survey or testing elements 406 contains three or more images; and second interaction area with survey or testing elements 408 also contains three or more images.

Figure 5:
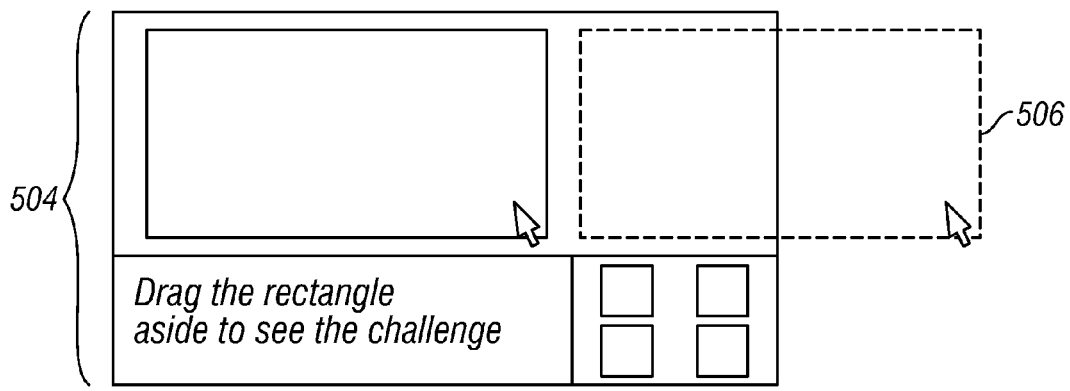
FIG. 5 is another sample user interface of a sample use case according to an embodiment.
Figure 5:
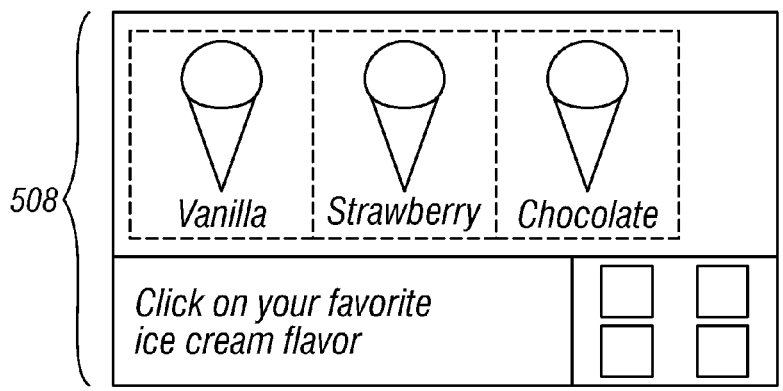

FIG. 5 is an example login page with HIP capability plus a survey. In this example, login and credential information 502 is requested from a user such as name, address, and password. As well, an HIP challenge is displayed 504 for the user which requests that the user drag a rectangle to see the survey or test. A dotted rectangle 506 is shown to indicate an example of where the user may drag the rectangle. Once the user complied with the request and dragged the rectangle to see the survey or test, an actual survey or test is displayed. In this particular example survey, three ice cream cones are presented 508, namely, vanilla, strawberry, and chocolate. Also displayed in the same area 508 is a survey question, "Click on your favorite ice cream flavor." One skilled in the art would readily recognize that variations on receiving the user's selection are allowed, may be implemented by design choice, and are not meant to be limiting. Thus, in this example, a Submit button is shown.

Figure 6:
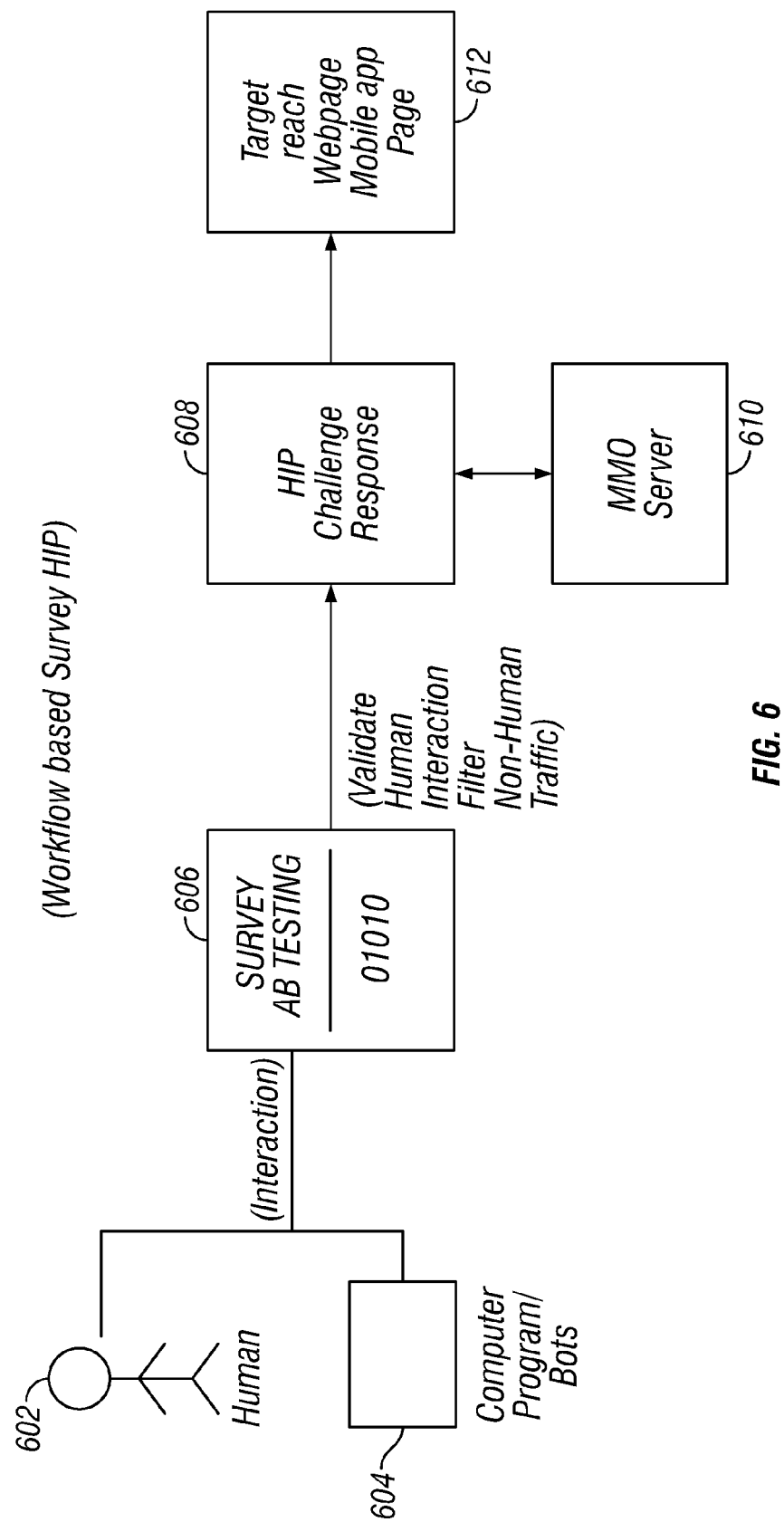
FIG. 6 is a flow diagram of a sample workflow-based survey HIP according to an embodiment.

FIG. 6 is a flow diagram of a high level workflow for serving an HIP enabled survey or test, according to an embodiment. This workflow is meant for illustrative purposes and for understanding only and is not meant to be limiting. A human 602 or a computer program such as an auto-bot 604 access and interact with a particular webpage 606. In this embodiment, webpage 606 contains a survey or test which the publisher of webpage 606 would like to present to a human user. In accordance with embodiments herein, webpage 606 is configured to display an HIP challenge as well as a survey of the publisher or other interested party. Once human 602 or bot 604 interact with webpage 606, responses are sent to an HIP challenge and response server 608 and an MMO server 610 to analyze the parts of the response that are relevant to each server, respectively. If it is determined that the responses came from bot 604, then the workflow end, thus filtering out non-human traffic. If it is determined that the responses came from human 602, then the responses are considered validated and workflow proceeds to a target landing 612, such as a target webpage or mobile application page for example.

Figure 7:
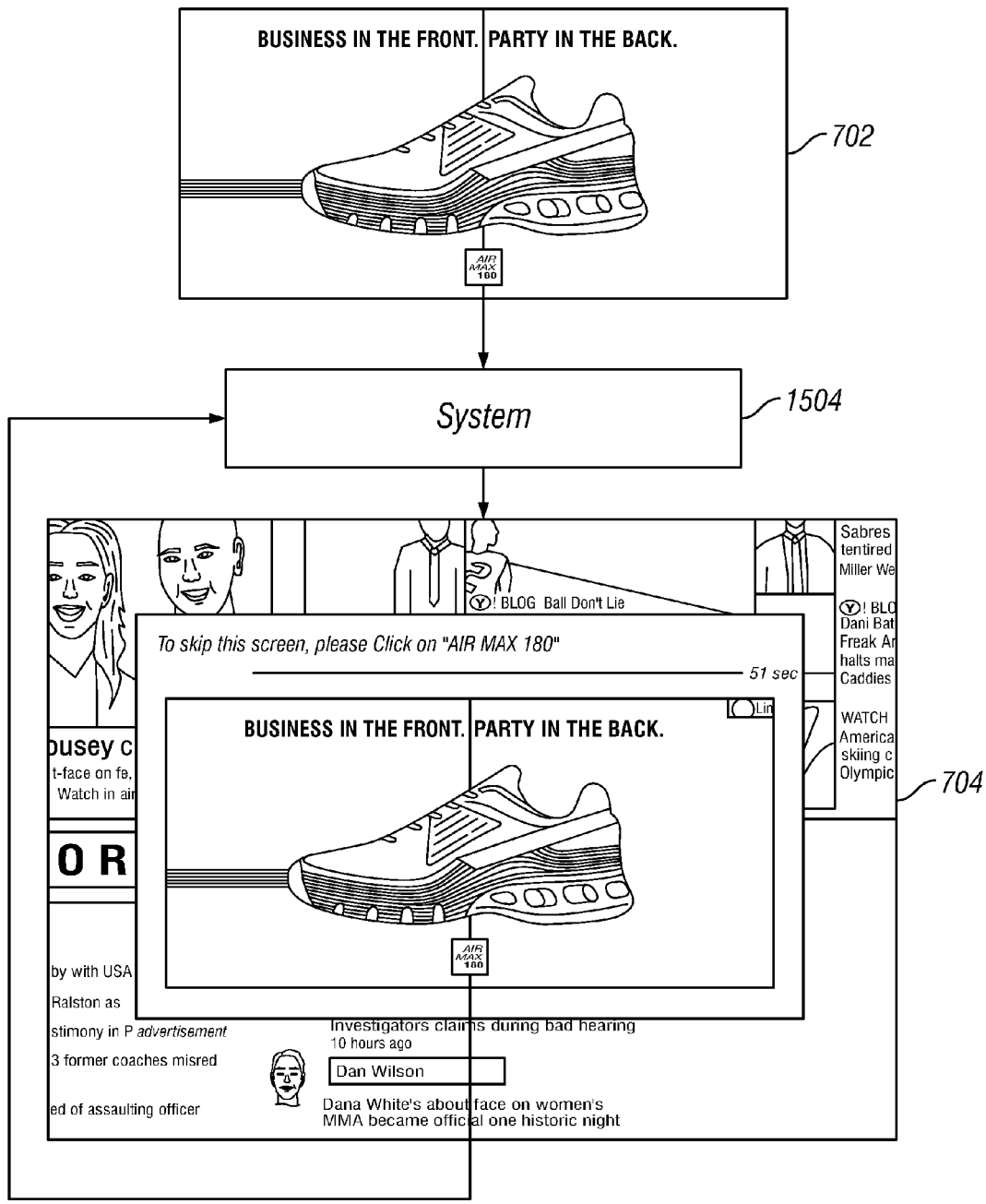
FIG. 7 is a flow diagram showing HIP capabilities incorporated into a sample ad according to an embodiment.

FIG. 7 is a flow diagram showing HIP capabilities incorporated into a sample ad for a particular use case according to an embodiment. An ad 702 created by an advertiser or any other entity is input into system 1504. In the example, system 1504 has been configured to add a particular challenge layer to the ad 704 for the user to solve before proceeding as intended. In this particular example, the challenge says, "To skip this screen, please click on 'AIR MAX 180'". It should be appreciated that such ad and any of its images are by way of example only.

Figure 8:
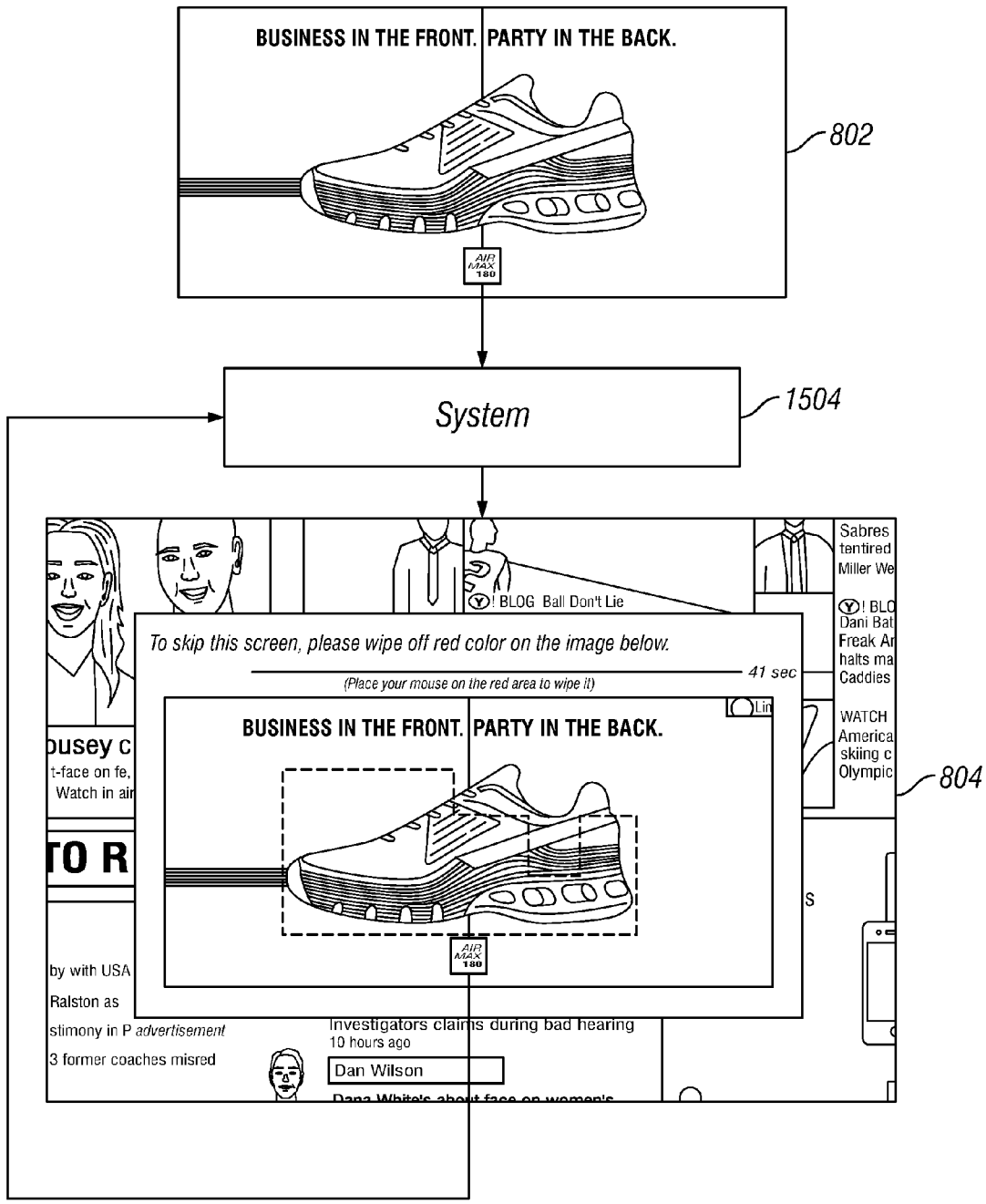
FIG. 8 is a flow diagram showing HIP capabilities incorporated into a sample ad according to an embodiment.

FIG. 8 is a flow diagram showing HIP capabilities incorporated into a sample ad for a particular use case according to an embodiment. An ad 802 created by an advertiser or any other entity is input into system 1504. In the example, system 1504 has been configured to add a particular challenge layer to the ad 804 for the user to solve before proceeding as intended. In this particular example, the challenge says, "To skip this screen, please wipe off red color on the image below". It also displays the following instruction, "Place your mouse on the red area to wipe it". It should be appreciated that such ad and any of its images are by way of example only.

Figure 9:
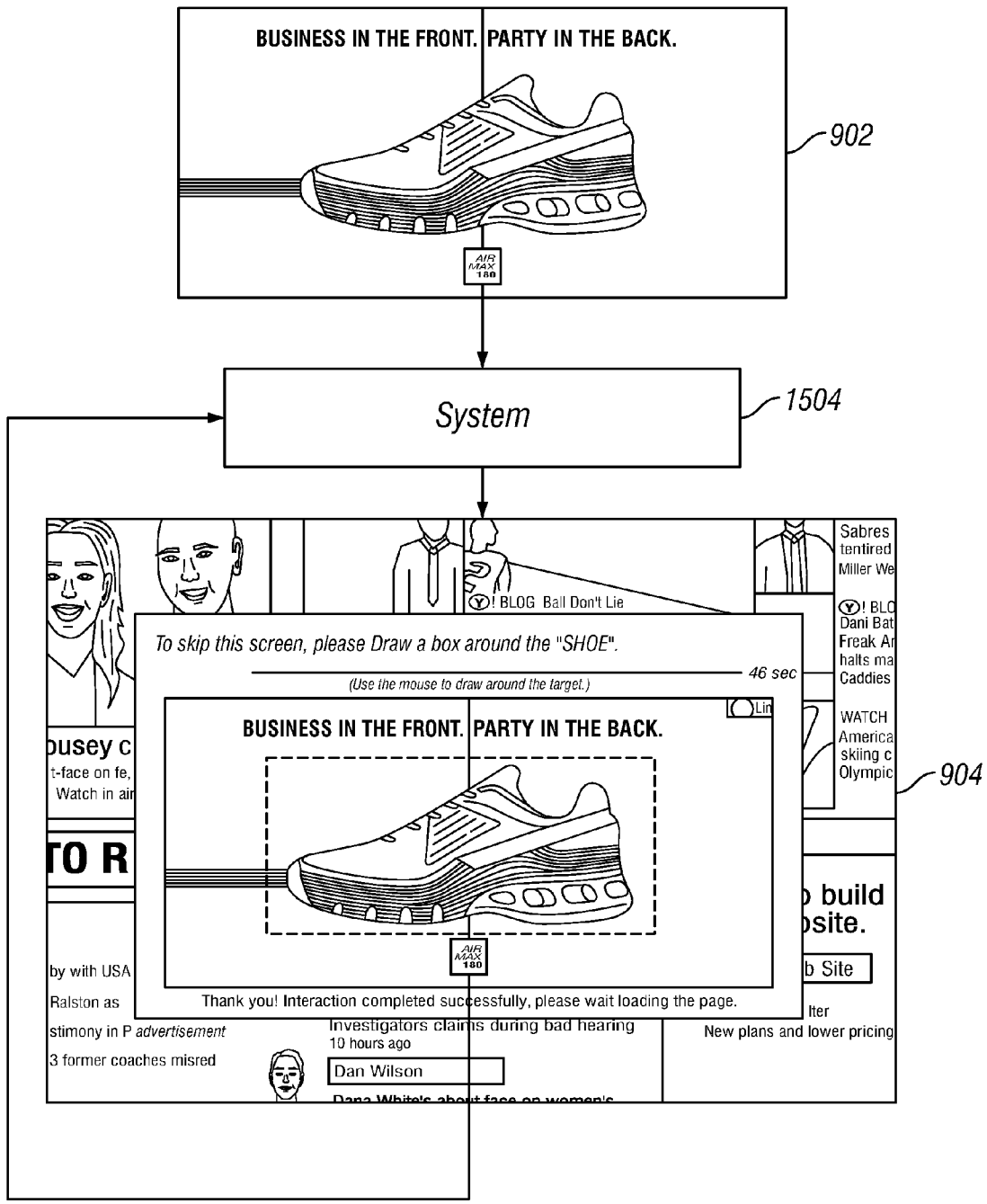
FIG. 9 is a flow diagram showing HIP capabilities incorporated into a sample ad according to an embodiment.

FIG. 9 is a flow diagram showing HIP capabilities incorporated into a sample ad for a particular use case according to an embodiment. An ad 902 created by an advertiser or any other entity is input into system 1504. In the example, system 1504 has been configured to add a particular challenge layer to the ad 904 for the user to solve before proceeding as intended. In this particular example, the challenge says, "To skip this screen, please draw a box around the shoe". It also displays the following instruction, "Use the mouse to draw around the target". It should be appreciated that such ad and any of its images are by way of example only.

Figure 10:
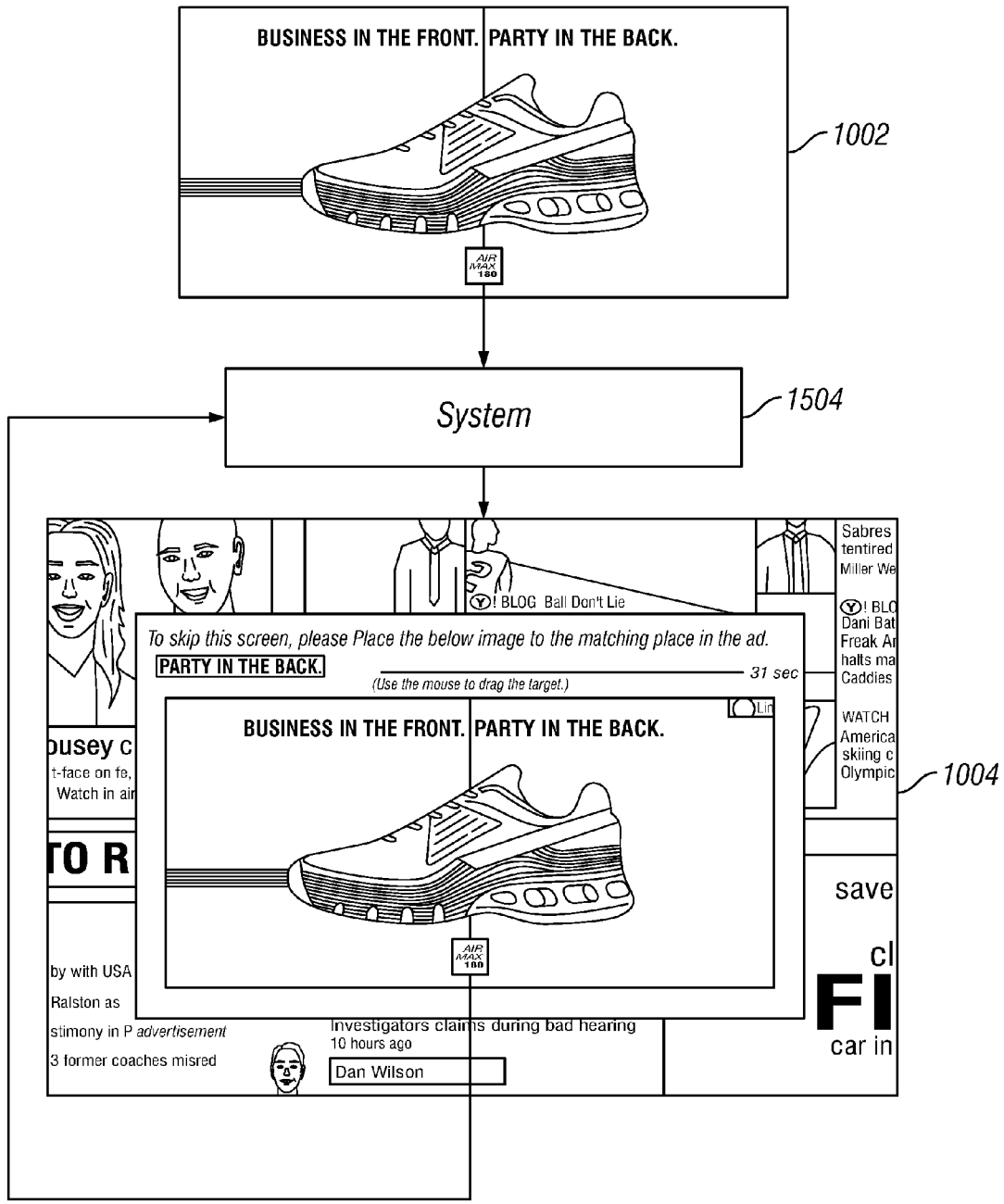
FIG. 10 is a flow diagram showing HIP capabilities incorporated into a sample ad according to an embodiment.

FIG. 10 is a flow diagram showing HIP capabilities incorporated into a sample ad for a particular use case according to an embodiment. An ad 1002 created by an advertiser or any other entity is input into system 1504. In the example, system 1504 has been configured to add a particular challenge layer to the ad 1004 for the user to solve before proceeding as intended. In this particular example, the challenge says, "To skip this screen, please place the below image to the matching place in the ad" and displays an image that is a replica of the same image within the ad. It also displays the following instruction, "Use the mouse to draw the target". It should be appreciated that such ad and any of its images are by way of example only.

Figure 11:
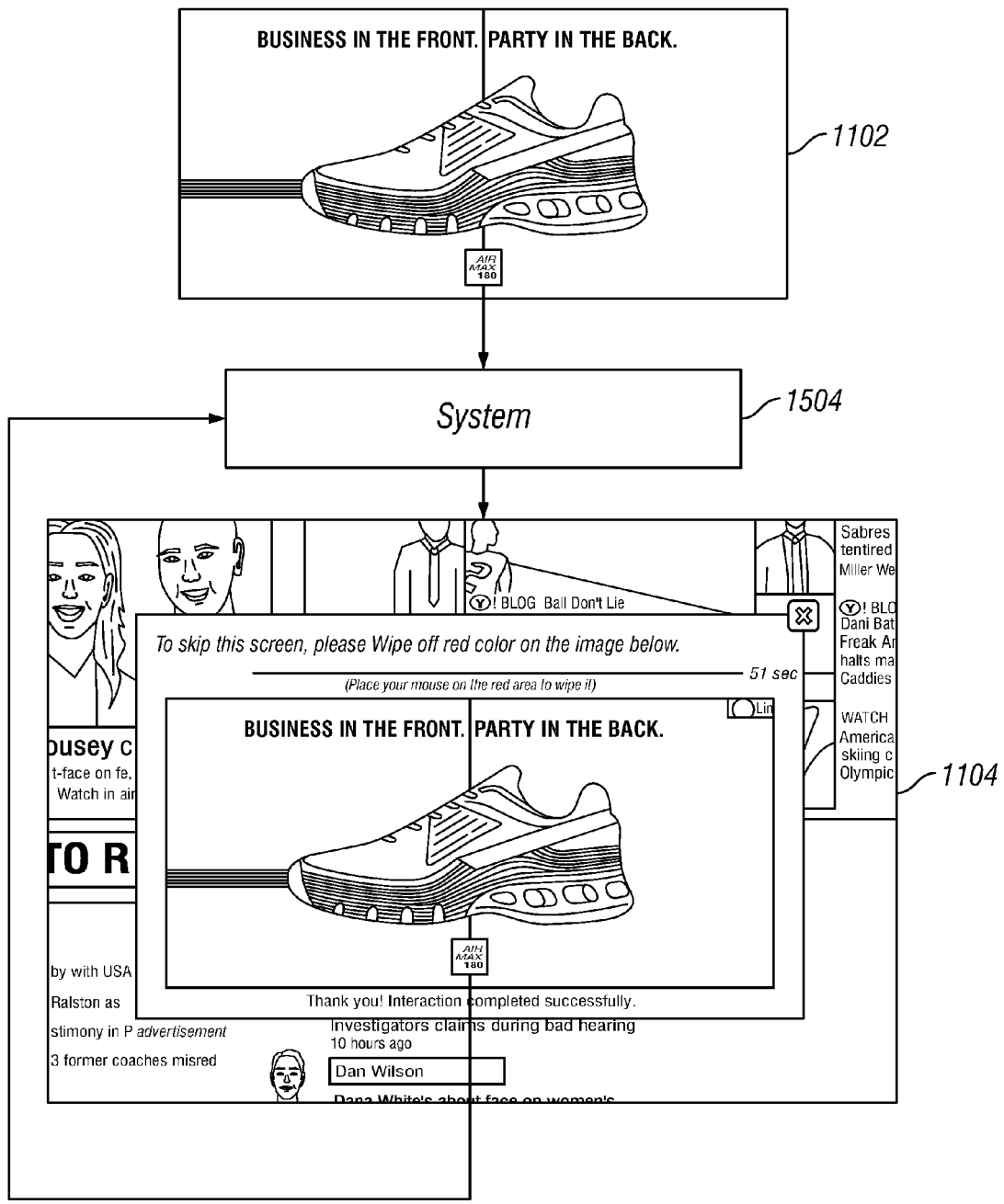
FIG. 11 is a flow diagram showing HIP capabilities incorporated into a sample ad according to an embodiment.

FIG. 11 is a flow diagram showing HIP capabilities incorporated into a sample ad for a particular use case according to an embodiment. An ad 1102 created by an advertiser or any other entity is input into system 1504. In the example, system 1504 has been configured to add a particular challenge layer to the ad 1104 for the user to solve before proceeding as intended. In this particular example, the challenge says, "To skip this screen, please wipe off the red color on the image below" and displays some red color. It also displays the following instruction, "Place your mouse on the read area to wipe it". It should be appreciated that such ad and any of its images are by way of example only.

Figure 12:
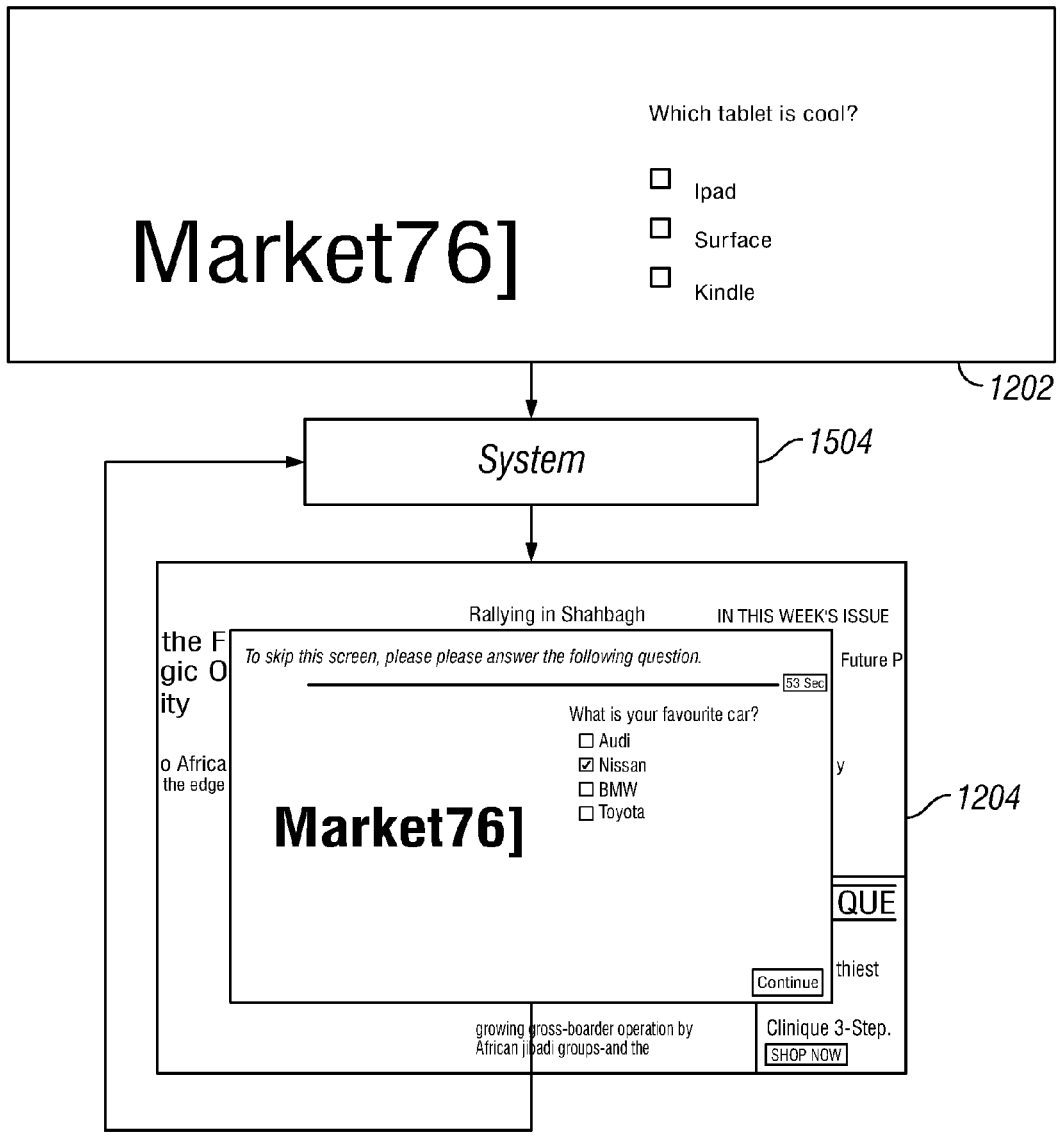
FIG. 12 is a flow diagram showing HIP capabilities incorporated into a sample survey according to an embodiment.

FIG. 12 is a flow diagram showing a survey incorporated into a sample ad for a particular use case according to an embodiment. A survey 1202 created by an advertiser or any other entity is input into system 1504. In the example, system 1504 has been configured to incorporate the survey into the workflow by prompting the user to answer the question in the survey in order to skip the screen. In this particular example, system 1504 displays the prompt at the top of the page and adds a "continue" button for the user to push when he or she has answered the survey question. It should be appreciated that such ad and any of its images are by way of example only.

Figure 13:
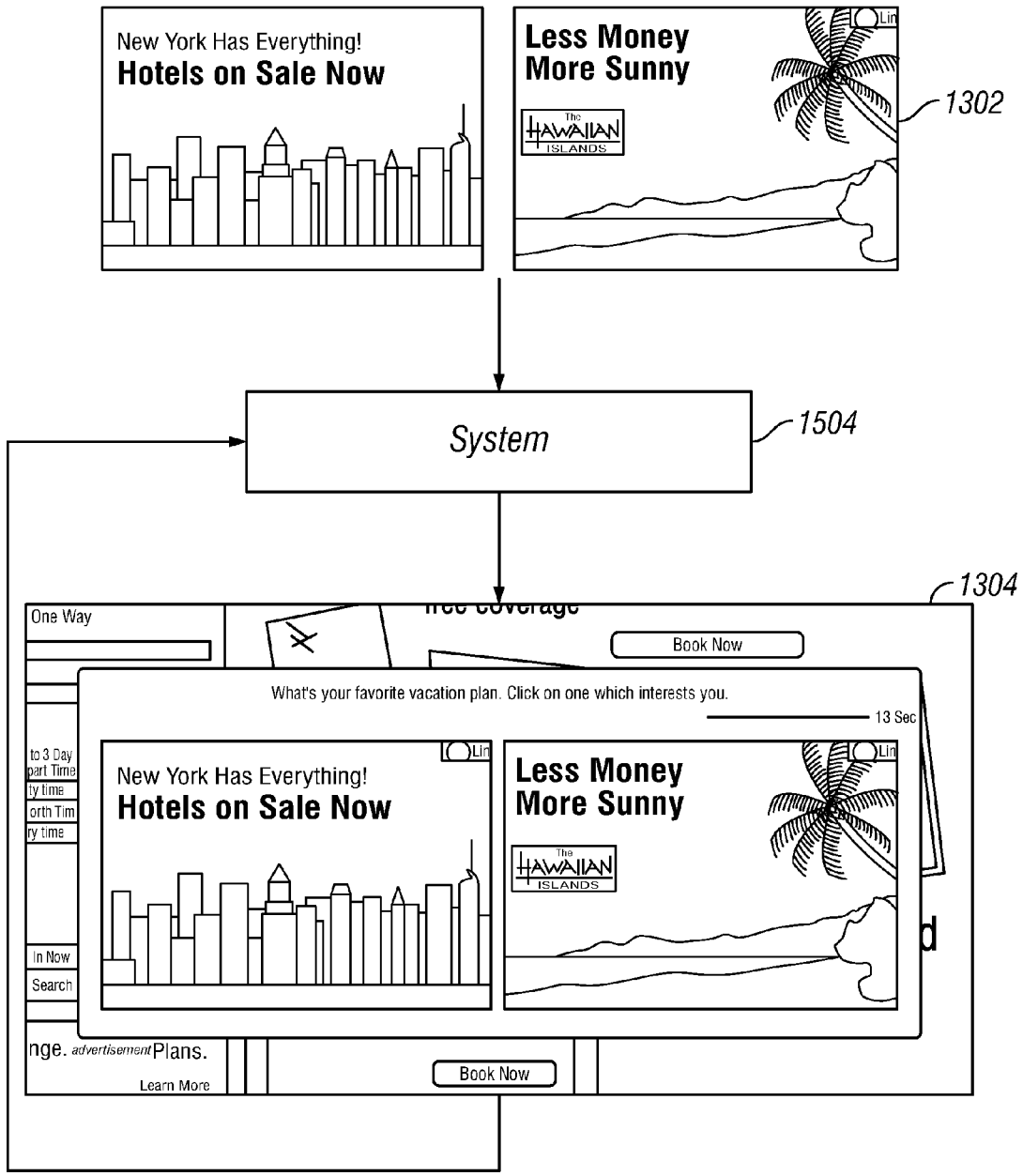
FIG. 13 is a flow diagram showing HIP capabilities incorporated into a sample survey according to an embodiment.

FIG. 13 is a flow diagram showing a AB test using two sample ads for a particular use case according to an embodiment. Two ads 1302 are created by an advertiser or any other entity are input into system 1504. In the example, system 1504 has been configured to incorporate the two ads into the workflow by presenting such ads as an AB test 1304 in order to skip the screen. In this particular example, system 1504 displays the prompt at the top of the page, which asks the user to click on which vacation plan interests the user. It should be appreciated that such ad and any of its images are by way of example only.

Figure 14:
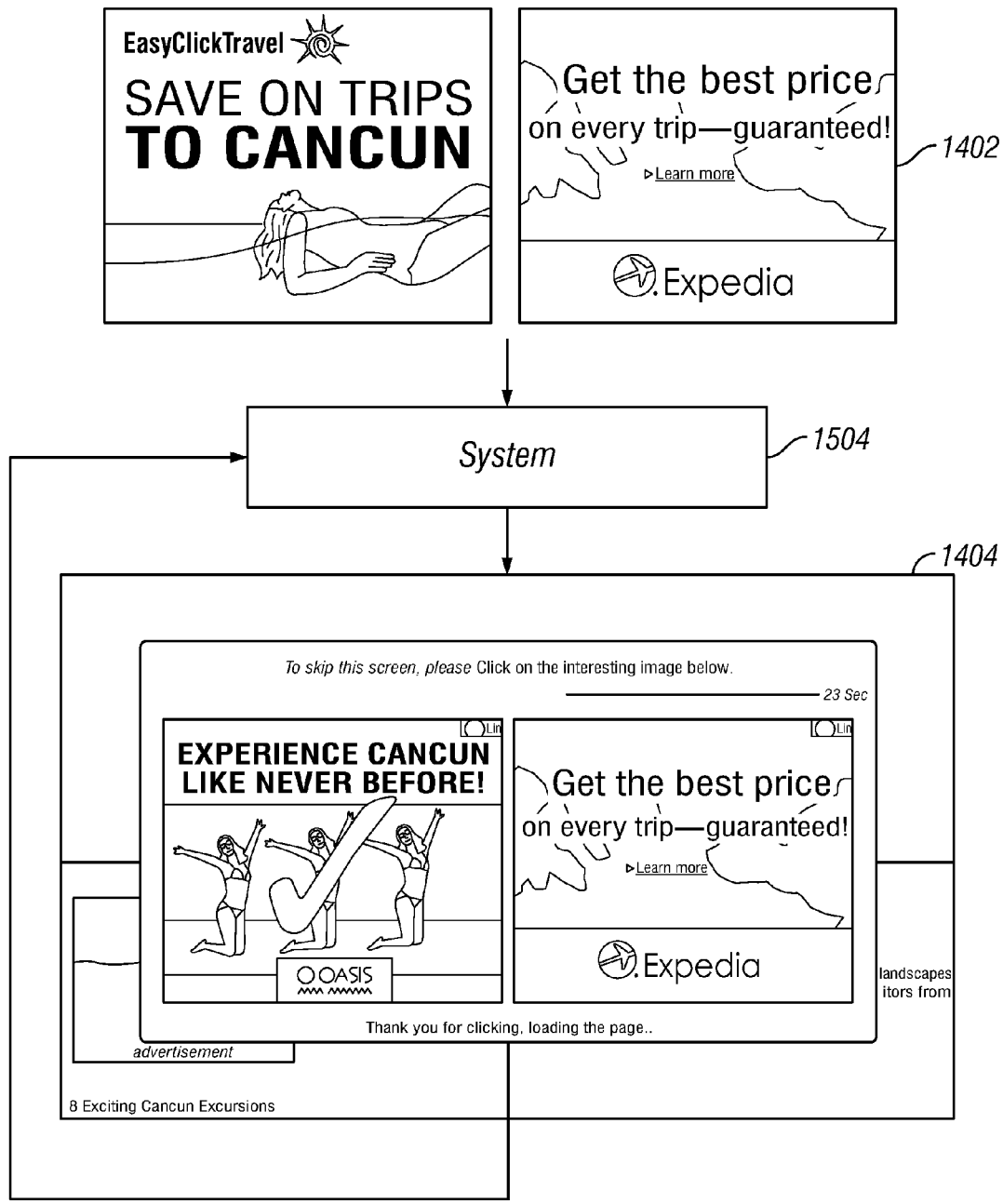
FIG. 14 is a flow diagram showing HIP capabilities incorporated into a sample survey according to an embodiment.

FIG. 14 is a flow diagram showing a AB test using two sample ads for a particular use case according to an embodiment. Two ads 1402 are created by an advertiser or any other entity are input into system 1504. In the example, system 1504 has been configured to incorporate the two ads into the workflow by presenting such ads as an AB test 1404 in order to skip the screen. In this particular example, the challenge says, "To skip this screen, click on the interesting image below". It should be appreciated that such ad and any of its images are by way of example only.

An Example Machine Overview

Figure 16:
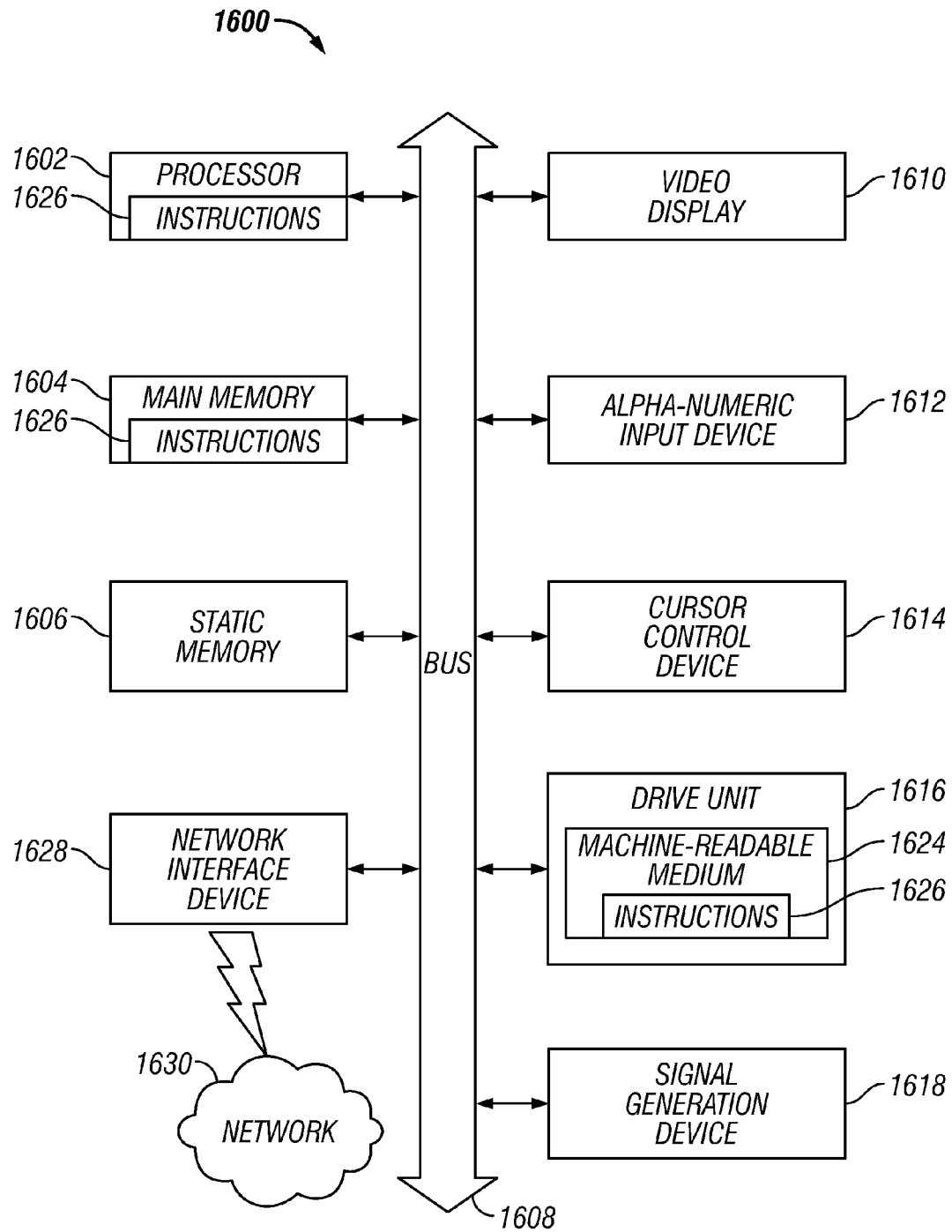
FIG. 16 is a block schematic diagram of a system in the exemplary form of a computer system according to an embodiment.

FIG. 16 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing components that enable users, e.g. users on the go, to be connected to or use the survey or test plus enabled or disabled HIP capabilities platform on such internet-enabled or other network-enabled devices, servers, or clients. It further should be appreciated that one or more cloud computing embodiments include enabling implementing or using the survey or test plus HIP capabilities using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for creating and implementing surveys or tests with human interaction proof (HIP) capabilities, comprising the steps of:
  responsive to a webpage being launched from a display, said webpage sending a request to a multi-media object server (MMOS), wherein said request comprises:
    informational data about the webpage or a corresponding application or system environment;
    an HIP requested or not parameter indicating whether HIP is requested or not; and
    a type of interaction parameter which indicates a type of interaction expected for HIP proof;
  responsive to receiving said request, MMOS parsing and extracting the parameters and the informational data and creating a unique request ID associated with the request;
  responsive to parsing and extracting the parameters and the informational data, said MMOS passing the extracted parameters to an AB testing or survey content server (ACS), wherein the unique request ID identifies the request and wherein ACS obtains surveys or testing data from a multi-media metadata database and survey or testing related media from a multi-media object repository;
  responsive to receiving the extracted parameters, the informational data, and the unique request, said ACS serving matched surveys or testing data, matched survey or testing related media ("MMO"), and the unique request ID to MMOS;
  responsive to parsing and extracting the parameters and the informational data, said MMOS determining whether the HIP requested or not parameter indicates whether HIP is requested;
    when HIP is requested, said MMOS calling a challenge and response repository for a challenge and response associated with said MMO, said challenge and response repository selecting a challenge, and said challenge and response repository sending said selected challenge to said MMOS;
  responsive to receiving said MMO, the unique request ID, and the challenge when present, said MMOS serving said MMO, unique request ID, and challenge when present to said webpage;
  responsive to receiving said MMO, unique request ID, and challenge when present, said webpage presenting said MMO and challenge when present to the display, capturing user responses to said challenge in a placeholder parameter, and sending said user responses in the placeholder parameter to a validation server for validating;
  responsive to receiving said captured user responses to said challenge when present, said validation server verifying said captured user responses by matching the captured user responses with expected responses in the challenge and response repository and when a match is found, sending a success message to said webpage;
  responsive to presenting said MMO, said webpage capturing input data from interaction with said MMO and sending said captured input data from interaction with said MMO said unique request ID to a status server module for storing statistical data;
  responsive to receiving the success message, said webpage continuing to proceed to a next step in a current workflow;
  wherein when a match is not found, said validation server determining whether a failure condition is met, wherein said failure condition is any of: based on a predefined number of attempts allowed before locking out a user from the current workflow, showing a new challenge with a new set of tests or surveys within a predetermined amount of time lapsed or a predetermined number of attempts; and
  wherein one or more steps are performed on at least a processor coupled to at least a memory.

2. The computer-implemented method of claim 1, wherein said informational data about the webpage or a corresponding application or system environment comprises an ip address, geo location, device type, carrier name, user demographic, or html cookie information related to the website or corresponding application.

3. The computer-implemented method of claim 1, wherein the HIP requested or not parameter is binary and is set to one value to indicate that HIP is requested and is set to the other value to indicate that HIP is not requested.

4. The computer-implemented method of claim 1, wherein types of interaction expected for HIP proof comprise any of: dragging a masked image to other co-ordinates and then allowing the user to interact with the image shown behind; clicking on various objects; moving or dragging various objects to a specified destination on a display; placing a mouse over an area of the display and going through the motion of wiping off something on the display; drawing something particular on the display; moving or dragging targets from one area of the display to another; or press buttons on the display.

5. The computer-implemented method of claim 1, wherein said surveys or testing data comprise survey questions, valid survey answers, links to survey images in said multi-media repository, or demographic data which may need to be targeted to surveys and wherein said survey or testing related media comprise images, videos, or audio files, any of which may be used as part of a survey or as part of testing.

6. The computer-implemented method of claim 1, wherein whether the challenge is dynamically or randomly generated and does not have any correlation to the content of said MMO or whether the challenge pertains to the content of said MMO is determined by a parameter sent along with the HIP requested or not parameter.

7. The computer-implemented method of claim 1, wherein user responses comprise any of: text entered as a response, attributes of a click, co-ordinates of a drag and drop action on the MMO, responses from haptic technology on supporting devices, or responses from touch and tactile sensors on supporting devices.

8. The computer-implemented method of claim 1, wherein when to show test or survey objects is a design decision wherein said design decision is configurable to indicate to show said test or survey objects preceded by HIP being satisfied or followed by HIP being satisfied.

9. The computer-implemented method of claim 1, wherein said captured input data from interaction with said MMO comprise any of: how much time a user hovered on the MMO, how many times the user tapped to solve the HIP, or how many times the MMO was displayed on the active screen of the user.

10. The computer-implemented method of claim 1, wherein MMOS is configurable and is configured for any of:
  showing the challenge, then showing the test or survey, and then sending both statistics for validation and statistics for data collection to the validation server and to the VS and to the status server module;

sending the response for validation at the validation server and then showing the test or survey; and showing the test or survey and then showing the HIP challenge.

11. A system for creating and implementing surveys or tests with human interaction proof (HIP) capabilities, comprising:

at least one processor operable to execute computer program instructions; and at least one memory operable to store computer program instructions executable by said at least one processor, for performing:

sending, by a webpage, a request to a multi-media object server (MMOS), responsive to the webpage being launched from a display, wherein said request comprises:

informational data about the webpage or a corresponding application or system environment;

an HIP requested or not parameter indicating whether HIP is requested or not; and a type of interaction parameter which indicates a type of interaction expected for HIP proof;

wherein said MMOS is further configured to parse and extract the parameters and the informational data and to create a unique request ID associated with the request, responsive to receiving the request;

wherein said MMOS is further configured to pass the extracted parameters to an AB testing or survey content server (ACS), and the informational data, responsive to parsing and extracting the parameters, wherein the unique request ID identifies the request and wherein ACS obtains surveys or testing data from a multi-media metadata database and survey or testing related media from a multi-media object repository;

wherein said ACS is configured to serve matched surveys or testing data, matched survey or testing related media ("MMO"), and the unique request ID to MMOS, responsive to receiving the extracted parameters, the informational data, and the unique request;

wherein the MMOS is further configured to determine whether the HIP requested or not parameter indicates whether HIP is requested responsive to parsing and extracting the parameters and the informational data;

wherein when HIP is requested, said MMOS calls a challenge and response repository for a challenge and response associated with said MMO, said challenge and response repository selecting a challenge, and said challenge and response repository sending said selected challenge to said MMOS;

wherein said MMOS is further configured to serve said MMO, unique request ID, and challenge when present to said webpage, responsive to receiving said MMO, the unique request ID, and the challenge when present;

wherein said webpage is further configured to present said MMO and challenge when present to the display responsive to receiving said MMO, unique request ID, and challenge when present, to capture user responses to said challenge in a placeholder parameter, and to send said user responses in the placeholder parameter to a validation server for validating;

wherein said validation server is further configured to verify, responsive to receiving said captured user responses to said challenge when present, said captured user responses by matching the captured user responses with expected responses in the challenge and response repository and when a match is found, to send a success message to said webpage;

wherein said webpage is further configured to capture input data from interaction with said MMO and to send said captured input data from interaction with said MMO said unique request ID to a status server module for storing statistical data, responsive to presenting said MMO; and wherein said webpage is further configured to continue to proceed to a next step in a current workflow responsive to receiving the success message;

wherein when a match is not found, said validation server is further configured to determine whether a failure condition is met, wherein said failure condition is any of:

based on a predefined number of attempts allowed before locking out a user from the current workflow, showing a new challenge with a new set of tests or surveys within a predetermined amount of time lapsed or a predetermined number of attempts.

12. The system of claim 11, wherein said informational data about the webpage or a corresponding application or system environment comprises an ip address, geo location, device type, carrier name, user demographic, or html cookie information related to the website or corresponding application.

13. The system of claim 11, wherein types of interaction expected for HIP proof comprise any of: dragging a masked image to other co-ordinates and then allowing the user to interact with the image shown behind; clicking on various objects; moving or dragging various objects to a specified destination on a display; placing a mouse over an area of the display and going through the motion of wiping off something on the display; drawing something particular on the display; moving or dragging targets from one area of the display to another; or press buttons on the display.

14. The system of claim 11, wherein said surveys or testing data comprise survey questions, valid survey answers, links to survey images in said multi-media repository, or demographic data which may need to be targeted to surveys and wherein said survey or testing related media comprise images, videos, or audio files, any of which may be used as part of a survey or as part of testing.

15. The system of claim 11, wherein whether the challenge is dynamically or randomly generated and does not have any correlation to the content of said MMO or whether the challenge pertains to the content of said MMO is determined by a parameter sent along with the HIP requested or not parameter.

16. The system of claim 11, wherein user responses comprise any of: text entered as a response, attributes of a click, co-ordinates of a drag and drop action on the MMO, responses from haptic technology on supporting devices, or responses from touch and tactile sensors on supporting devices.

17. The system of claim 11, wherein when to show test or survey objects is a design decision wherein said design decision is configurable to indicate to show said test or survey objects preceded by HIP being satisfied or followed by HIP being satisfied.

18. The system of claim 11, wherein said captured input data from interaction with said MMO comprise any of: how much time a user hovered on the MMO, how many times the user tapped to solve the HIP, or how many times the MMO was displayed on the active screen of the user.

19. The system of claim 11, wherein MMOS is configurable and is configured for any of:

showing the challenge, then showing the test or survey, and then sending both statistics for validation and statistics for data collection to the validation server and to the VS and to the status server module;

sending the response for validation at the validation server and then showing the test or survey; and showing the test or survey and then showing the HIP challenge.

20. A non-transitory storage medium having stored thereon a computer program comprising a program code to perform a method for creating and implementing surveys or tests with human interaction proof (HIP) capabilities when the computer program is executed on a computer, the method comprising the steps of:

responsive to a webpage being launched from a display, said webpage sending a request to a multi-media object server (MMOS), wherein said request comprises:
informational data about the webpage or a corresponding application or system environment;
an HIP requested or not parameter indicating whether HIP is requested or not; and
a type of interaction parameter which indicates a type of interaction expected for HIP proof;

responsive to receiving said request, MMOS parsing and extracting the parameters and the informational data and creating a unique request ID associated with the request;

responsive to parsing and extracting the parameters and the informational data, said MMOS passing the extracted parameters to an AB testing or survey content server (ACS), wherein the unique request ID identifies the request and wherein ACS obtains surveys or testing data from a multi-media metadata database and survey or testing related media from a multi-media object repository;

responsive to receiving the extracted parameters, the informational data, and the unique request, said ACS serving matched surveys or testing data, matched survey or testing related media ("MMO"), and the unique request ID to MMOS;

responsive to parsing and extracting the parameters and the informational data, said MMOS determining whether the HIP requested or not parameter indicates whether HIP is requested;

when HIP is requested, said MMOS calling a challenge and response repository for a challenge and response associated with said MMO, said challenge and response repository selecting a challenge, and said challenge and response repository sending said selected challenge to said MMOS;

responsive to receiving said MMO, the unique request ID, and the challenge when present, said MMOS serving said MMO, unique request ID, and challenge when present to said webpage;

responsive to receiving said MMO, unique request ID, and challenge when present, said webpage presenting said MMO and challenge when present to the display, capturing user responses to said challenge in a placeholder parameter, and sending said user responses in the placeholder parameter to a validation server for validating;

responsive to receiving said captured user responses to said challenge when present, said validation server verifying said captured user responses by matching the captured user responses with expected responses in the challenge and response repository and when a match is found, sending a success message to said webpage;

responsive to presenting said MMO, said webpage capturing input data from interaction with said MMO and sending said captured input data from interaction with said MMO said unique request ID to a status server module for storing statistical data;

responsive to receiving the success message, said webpage continuing to proceed to a next step in a current workflow; and wherein when a match is not found, said validation server determining whether a failure condition is met, wherein said failure condition is any of: based on a predefined number of attempts allowed before locking out a user from the current workflow, showing a new challenge with a new set of tests or surveys within a predetermined amount of time lapsed or a predetermined number of attempts.

* * * * *